July 19, 1927.
J. S. SHAW
1,636,151
FURNACE FOR MELTING AND REFINING GLASS AND OTHER LIKE PURPOSES
Filed June 16, 1924 2 Sheets-Sheet 1
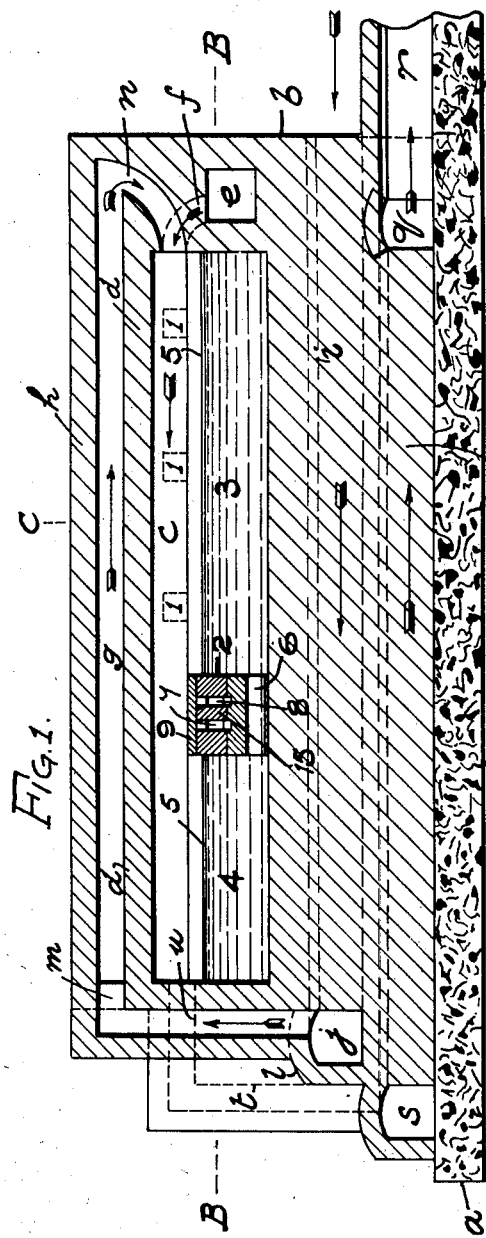
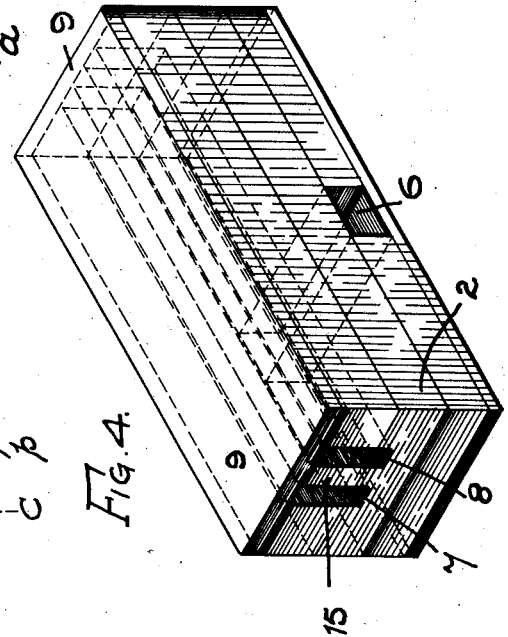
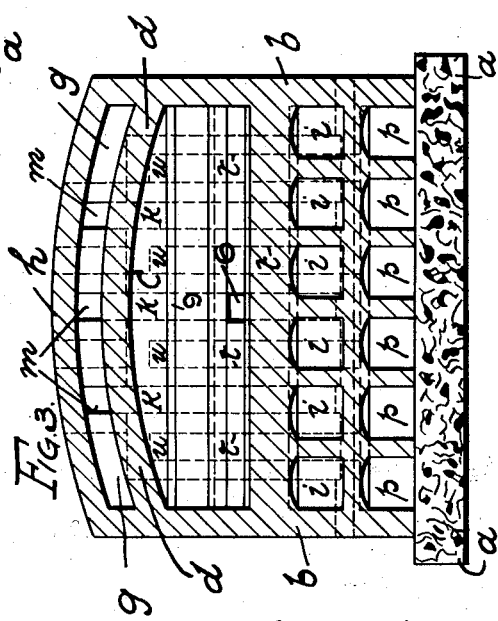

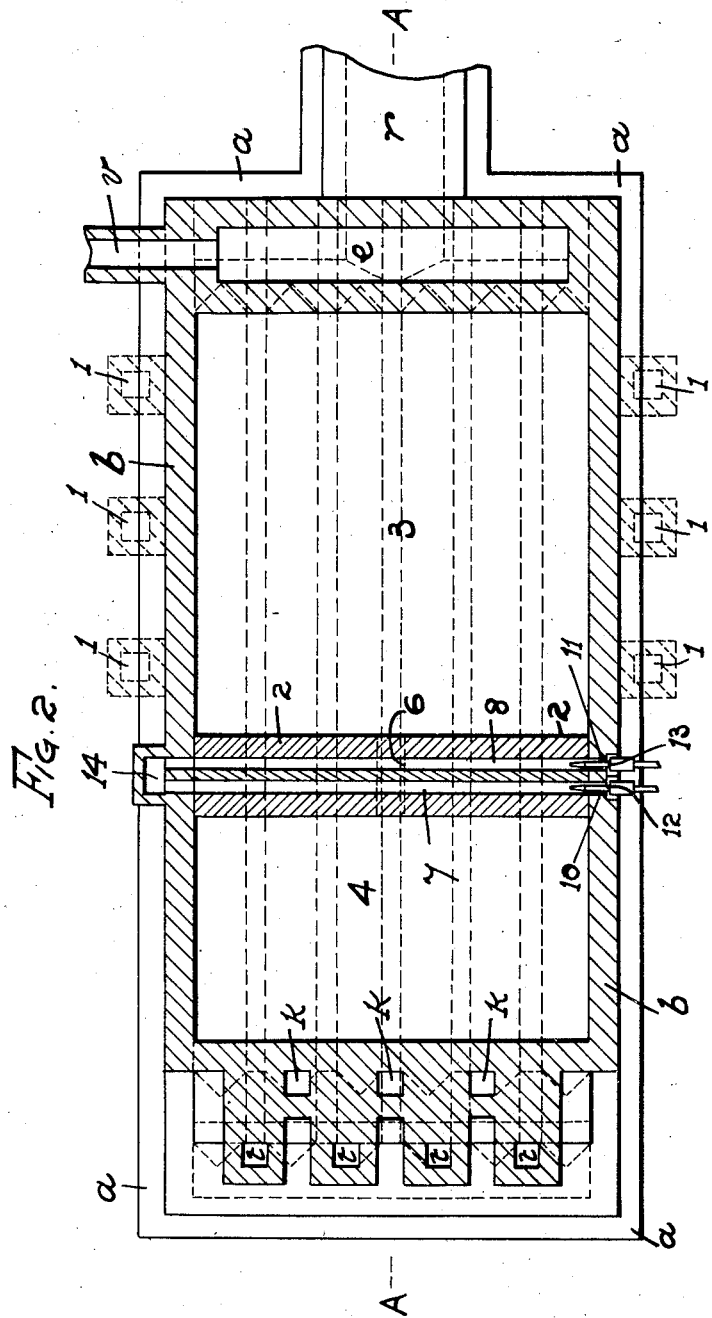

Patented July 19, 1927.

1,636,151

UNITED STATES PATENT OFFICE.

JOHN SCHOFIELD SHAW, OF LEEDS, ENGLAND.

FURNACE FOR MELTING AND REFINING GLASS AND OTHER LIKE PURPOSES.

Application filed June 16, 1924, Serial No. 720,309, and in Great Britain August 23, 1922.

This invention relates to the construction of furnaces for the melting, refining and working of molten glass, and for other like purposes.

In furnaces at present in use a solid bridge of fireclay blocks is provided, and it is arranged between the melting and refining ends of the furnace, hereinafter termed respectively "the melting tank" and "the refining tank." The molten glass flows from the melting tank to the refining tank of the furnace underneath the solid bridge, and by the bridge being formed of solid fire blocks the heat and fluxes in the metal rapidly destroy the bridge.

There is also at present in use another device called a throat, which consists of a fire block covered channel connecting the melting tank with the refining tank of the furnace, and the molten metal flows from the melting tank to the refining tank through the throat. This arrangement in addition to being very costly is also very unsatisfactory in use.

According to this invention it is proposed in place of a solid bridge or throat joining the two said parts of the furnace together to place an additional wall between the said two portions. The dividing wall is provided with one or more dog holes or channels running through the said wall and from the end of one tank to the other end of the second tank, thus joining the two tanks together.

In the dividing wall and transversely across the furnace are provided two air spaces open at one end to admit of cold air or steam being passed through the said passages to a vertical flue for conveying the cold air and steam away. These air spaces are provided for keeping the dividing wall cool, as will be further explained.

The air spaces and the dog holes or channels are arranged at right angles to each other.

In the drawings hereunto annexed the dividing wall is shown applied to a furnace as described in the specification of U. S. American Letters Patent granted to me under No. 1,359,756, dated 23rd November 1920, but I would distinctly have it understood that the application of the dividing wall is not limited to this particular construction of furnace but it may be applied to other furnaces requiring the use of an additional wall.

For convenience of reference the furnace is marked with similar letters of reference to those described in the before mentioned specification, but the dividing wall and parts connected therewith will be marked with reference numerals.

Fig. 1 is a sectional elevation on line A, A, Fig. 2 of a glass melting and refining furnace;

Fig. 2 is a sectional plan on line B, B, Fig. 1;

Fig. 3 is a vertical sectional elevation on line C, C, Fig. 1;

Fig. 4 is an isometric view of bridge or dividing wall constructed according to this invention and removed from Figs. 1 and 2.

$a$ is a concrete foundation upon which the furnace $b$ is built. $c$ the space which forms the flue or combustion chamber between the tops of the melting tank and refining tank and the crown $d$ of the furnace. $e$ the gas chamber which may either communicate with the combustion chamber $c$ through one or more flues $f$, or by a number of flues 1, 1, shown in dotted lines at Figs. 1 and 2. $g$ is the chamber in which the cold air is heated prior to reaching the passages $n$ which convey it to the combustion chamber $c$. $h$ is a crown which forms the top of the flue $g$. $i$, $i$, are a series of flues which convey air from the front,—right hand end,—of the furnace to a transverse flue $j$ arranged at the rear,—left hand end,—of the furnace. $k$, $k$ are vertical flues communicating with the transverse flue $j$ at their inner ends, and at their outer ends with a series of short tubes $m$ which communicate with the flue $g$. The flues $i$ may be provided with a number of arches or crowns $l$, as shown. $p$, $p$ a series of longitudinal flues at the rear end of the furnace which communicate at one end with a transverse flue $q$ and at this end also with waste gas flue $r$ for conveying the waste gases to the chimney. At the opposite or rear end of the flues $p$ is a second transverse chamber $s$. The combustion chamber $c$ and the chamber $s$ are connected together by a number of vertical flues $t$ and horizontal flues $u$. $v$ the flue for supplying the gas from a producer or other source.

The dividing wall 2 which forms an essential feature of this invention is placed transversely in and below the combustion chamber $c$ for dividing it into two portions, namely, a melting tank 3 and a refining tank 4. These tanks may be of the same or different sizes. In the drawings they are shown to be of different sizes, and in height the dividing wall 2 is arranged a suitable height above the metal level 5, 5, (Fig. 1). The dividing wall may be of any suitable depth and width, and it is formed of a number of blocks of fireclay or other refractory material. In the dividing wall is or are formed one or more dog holes or channels 6 which pass entirely through the said wall at or about a right angle to its outer surfaces for forming a communication between the melting tank 3 and the refining tank 4 through which the metal melted in tank 3 can pass into and be refined in tank 4.

In the dividing wall 2, which practically forms a bridge, are provided two passages 7 and 8 parallel with the sides of the dividing wall, and which are arranged to extend a suitable distance from the covering slab or block 9 into, say, the second layer of blocks which form the dividing wall.

Openings 10 and 11 are formed in one of the walls $b$ for the admission of cold air or steam into the transverse passages 7 and 8 in the dividing walls, and when steam is required to be admitted for causing a forced draught, then the nozzles 12 and 13,—which may be of any suitable construction,—are employed, and the inner ends of such nozzles are arranged to pass respectively into the passages 7 and 8. The opposite end of the transverse passages 7 and 8 are arranged to communicate with a vertical flue 14 which in turn is connected to, or is in communication with, one of the passages $p$. Each passage is independent of the other except having a common connection with the vertical passage 14 (Fig. 2), and a middle wall 15 is formed in the centre of the dividing wall 2, whereby the fire blocks forming the dividing wall at its portion nearest the end of the melting tank 3, and also the blocks of the wall nearest the refining tank 4, and the middle wall 15, are kept cool and the life of the furnace will be prolonged.

When the blocks nearest the melting tank are worn through the molten metal in tank 3 will have to pass through the cooling chamber 8 and also through the middle wall 15 before it reaches the transverse passage 7, and the metal will then have lost a great deal of its power of destruction. Further, before the metal can communicate with the refining tank 4, except through the dog hole or holes 6, it will require to destroy the middle wall 15 before it can attack the blocks in the refining tank of the furnace, and before doing so it will be brought again in contact with the cold air and steam that passes through the passage 7.

Other parts of the furnace may be as described in the before mentioned specification, or of ordinary construction and the furnace may be fed with metal and the refined molten metal withdrawn in the usual and ordinary manner.

What I claim is:—

1. In a furnace for melting and refining glass, a dividing wall, said wall being formed of a plurality of renewable blocks, a plurality of passages extending longitudinally through said wall for receiving a cooling medium, a central wall provided by said passages and cooled upon opposite sides by said cooling medium, a second series of passages extending transversely through said wall whereby the molten material upon one side of said furnace may pass to the other division thereof.

2. In a furnace for melting and refining glass and other materials, the combination of the internal portion of the furnace which receives the material to be operated upon with a dividing wall having a number of longitudinal passages formed therein, one end of each passage communicating with the outer air for the admission of cold air and steam, a vertical flue with which the said longitudinal passages communicate, said flue also communicating with the flues arranged below the bottom of the tanks, which flues communicate with the chimney, a number of dog holes formed at right angles to the said longitudinal flues for forming a communication between the melting tank and the refining tank, as set forth.

3. In a furnace for melting and refining glass and other materials, the combination of a furnace having a series of longitudinal flues arranged on different levels below the bottom of the tanks of the furnace, a dividing wall for dividing the main chamber of the furnace into two tanks for respectively melting and refining the material under operation, said dividing wall having formed therein longitudinal air and steam passages parallel with its sides, and a number of dog holes formed at a right angle with the said longitudinal passages, a vertical passage with which the longitudinal passages communicate, flues for admitting and heating cold air prior to being admitted to a combustion chamber arranged above the said tanks, and flues for conveying the products of combustion away from the combustion chamber, as set forth.

4. In a furnace for melting and refining glass and other materials, the combination of the internal portion of the furnace which receives the material to be operated upon, of a dividing wall formed of a plurality of renewable members and having a number of longitudinal air passages formed therein, a vertical flue communicating with said air passages, and with passages arranged below the bottom of the furnace and communicating with a chimney, a number of transverse passages formed in the dividing wall and extending at an angle to said first mentioned passages, the said transverse passages being arranged in a different plane to said first mentioned passages for forming communication between the two divisions of the furnace.

5. In a furnace for melting glass and other materials, the combination of a furnace having a single chamber for receiving material, a series of longitudinal flues arranged on different levels below the bottom of the chamber, a dividing wall for said chamber, said wall being formed of a plurality of renewable blocks or slabs, longitudinal air passages formed in said wall and providing a central wall therebetween, said passages communicating with a vertical flue, and a number of transverse passages formed in the dividing wall and disposed at an angle to said first mentioned passages, and in a different plane therefrom, and flues for admitting and heating cold air prior to being admitted to a combustion chamber arranged above said first mentioned chamber, and flues for conveying the products of combustion away from the combustion chamber.

6. In a furnace of the class described, the combination of a single chamber, a dividing wall arranged in said chamber providing two compartments for receiving the material under treatment, said dividing wall being formed of renewable bricks, passages formed in said wall and extending therethrough whereby air may be supplied to said passages for cooling the wall in contact with the heated material, a central wall formed by said passages, and a number of other passages formed in said dividing wall and arranged at an angle to said first mentioned passages and in a different plane therefrom for providing communication between the two compartments, a vertical flue communicating with said air passages, and flues for conveying heated air to the combustion chamber and for withdrawing the products of combustion therefrom, arranged above and below the said chamber.

JOHN SCHOFIELD SHAW.